(12) United States Patent
Kumar et al.

(10) Patent No.: US 10,051,422 B1
(45) Date of Patent: Aug. 14, 2018

(54) METHOD AND/OR SYSTEM FOR POSITIONING OF A MOBILE DEVICE

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/597,409

(22) Filed: May 17, 2017

(51) Int. Cl.
*H04W 24/00* (2009.01)
*H04W 4/02* (2018.01)
(Continued)

(52) U.S. Cl.
CPC ........... *H04W 4/023* (2013.01); *G01S 5/0236* (2013.01); *G01S 5/14* (2013.01); *H04W 4/027* (2013.01);
(Continued)

(58) Field of Classification Search
CPC ... H04L 63/08; H04L 67/104; H04L 2209/80; H04L 63/0407; H04L 63/061; H04L 63/123; H04L 63/164; H04L 2209/24; H04L 2209/76; H04L 2463/101; H04L 63/1408; H04L 9/083; H04L 9/3263; H04L 61/1511; H04M 2250/12; H04M 1/72572; H04M 2250/64; H04M 1/04; H04M 1/6091; H04M 1/72527; H04M 1/6066; H04M 1/725; H04M 1/72519; H04M 2242/30; H04M 2250/04; H04M 3/567; G01C 17/00; G01C 21/08; G01C 17/02; H04W 74/0833; H04W 72/0413; H04W 52/245; H04W 56/005; H04W 72/0473; H04W 74/004; H04W 74/08; H04W 84/047; H04W 88/02; H04W 88/08; H04W 36/0066; H04W 36/0072; H04W 72/04; H04W 16/32; H04W 84/045; H04W 48/16; H04W 36/00; H04W 36/0088; H04W 36/04; H04W 36/0016; H04W 52/0209; H04W 64/003;
(Continued)

(56) References Cited

U.S. PATENT DOCUMENTS

2009/0029714 A1* 1/2009 Rudrapatna ........... H04L 5/0053
455/452.2
2012/0020320 A1* 1/2012 Issakov ................. G01S 5/0221
370/330
(Continued)

FOREIGN PATENT DOCUMENTS

CN 105208653 A 12/2015

*Primary Examiner* — Nimesh Patel
(74) *Attorney, Agent, or Firm* — Berkeley Law & Technology Group, LLP

(57) ABSTRACT

Methods and systems are disclosed for obtaining a locus of an estimated location of a mobile device. According to an embodiment, a mobile device may obtain a plurality of timing advance parameters based, at least in part, on frames transmitted from the mobile device to a plurality of base stations on uplink channels to the plurality of base stations. A timing advance parameter may be selected from among the plurality of timing advance parameters to a particular base station of the plurality of base stations, wherein the particular base station is not a base station of a primary cell. The locus of the estimated location of the mobile device may then be determined based, at least in part, on a location of the particular base station and the selected timing advance parameter.

30 Claims, 7 Drawing Sheets

(51) Int. Cl.
*H04W 24/08* (2009.01)
*H04W 74/00* (2009.01)
*G01S 5/02* (2010.01)
*G01S 5/14* (2006.01)
*H04W 84/04* (2009.01)

(52) U.S. Cl.
CPC ......... *H04W 24/08* (2013.01); *H04W 74/004* (2013.01); *H04W 84/042* (2013.01)

(58) Field of Classification Search
CPC ......... H04W 88/06; H04W 8/08; H04W 8/24; H04W 36/0083; H04W 48/04; H04W 4/021; H04W 24/10; H04W 24/02; H04W 72/082; H04W 72/085; H04W 36/08; H04W 72/0453; H04W 36/0094; H04W 16/18; H04W 36/0061; H04W 64/00
See application file for complete search history.

(56) References Cited

U.S. PATENT DOCUMENTS

| | | | |
|---|---|---|---|
| 2012/0214512 A1* | 8/2012 | Siomina | G01S 5/0205 455/456.2 |
| 2013/0303232 A1* | 11/2013 | Thomas | H04W 52/146 455/550.1 |
| 2014/0315582 A1* | 10/2014 | Dong | H04W 64/00 455/456.2 |
| 2015/0223125 A1 | 8/2015 | Lu et al. | |
| 2015/0312815 A1* | 10/2015 | Wanstedt | H04W 36/0077 455/436 |
| 2016/0205499 A1 | 7/2016 | Davydov et al. | |
| 2016/0227507 A1 | 8/2016 | Uchino et al. | |
| 2016/0295366 A1 | 10/2016 | Priyanto et al. | |
| 2017/0094631 A1* | 3/2017 | Pon | H04W 64/00 |

* cited by examiner

METHOD AND/OR SYSTEM FOR POSITIONING OF A MOBILE DEVICE

BACKGROUND

Field

Subject matter disclosed herein relates to estimation of a location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Other techniques, such as enhanced Cell-ID (E-CID), may provide a position fix faster than OTDOA techniques, but with less accuracy. In one implementation of E-CID, range between a mobile device and base station (e.g., an eNodeB base station) may be estimated based, at least in part, on a timing advance parameter obtained based, at least in part, on signals transmitted from the mobile device to the base station on an uplink channel.

SUMMARY

Briefly, one particular implementation is directed to a method, at a computing device, comprising: obtaining a plurality of timing advance parameters determined based, at least in part, on signals transmitted from a mobile device to a plurality of base stations on uplink channels to the plurality of base stations; selecting a timing advance parameter from among the plurality of timing advance parameters based on signals transmitted to a selected base station of the plurality of base stations, wherein the selected base station serves a cell other than a primary cell; and determining a locus of an estimated location of the mobile device based, at least in part, on a location of the selected base station and the selected timing advance parameter.

Another particular implementation is directed to a computing device, comprising: a memory; and one or more processors coupled to the memory and configured to: obtain a plurality of timing advance parameters determined based, at least in part, on signals transmitted from a mobile device to a plurality of base stations on uplink channels to the plurality of base stations; select a timing advance parameter from among the plurality of timing advance parameters based on signals transmitted to a selected base station of the plurality of base stations, wherein the selected base station serves a cell other than a primary cell; and determine a locus of an estimated location of the mobile device based, at least in part, on a location of the selected base station and the selected timing advance parameter.

Another particular implementation is directed to a storage medium comprising computer-readable instructions stored thereon which are executable by one or more processors of a computing device to: obtain a plurality of timing advance parameters determined based, at least in part, on signals transmitted from a mobile device to a plurality of base stations on uplink channels to the plurality of base stations; select a timing advance parameter from among the plurality of timing advance parameters based on signals transmitted to a selected base station of the plurality of base stations, wherein the selected base station serves a cell other than a primary cell; and determine a locus of an estimated location of the mobile device based, at least in part, on a location of the selected base station and the selected timing advance parameter.

Another particular implementation is directed to a computing device comprising: means for obtaining a plurality of timing advance parameters determined based, at least in part, on signals transmitted from a mobile device to a plurality of base stations on uplink channels to the plurality of base stations; means for selecting a timing advance parameter from among the plurality of timing advance parameters based on signals transmitted to a selected base station of the plurality of base stations, wherein the selected base station serves a cell other than a primary cell; and means for determining a locus of an estimated location of the mobile device based, at least in part, on a location of the selected base station and the selected timing advance parameter.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
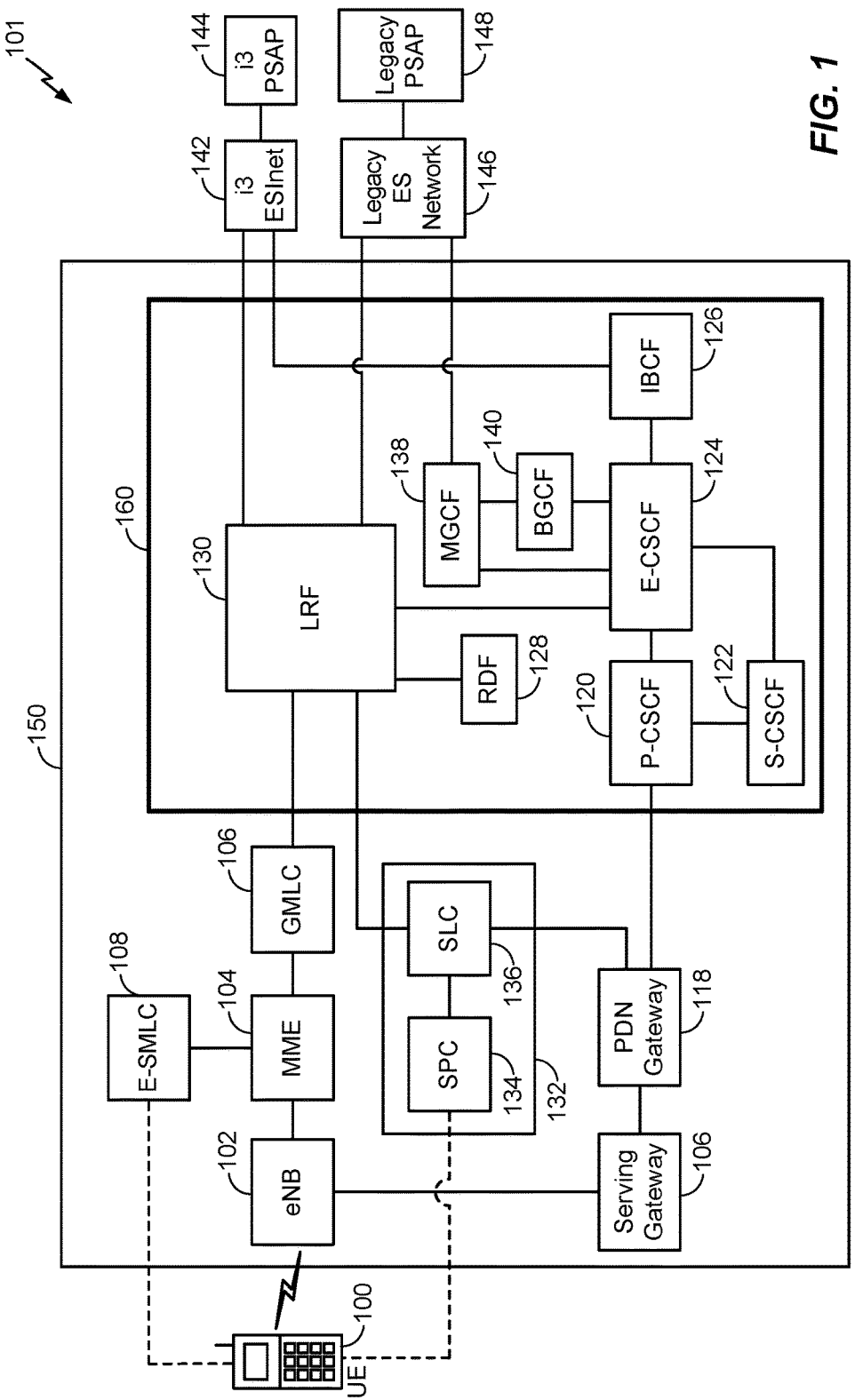
FIG. 1 is an example architecture for terrestrial positioning with 3GPP long term evolution (LTE) access.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/ or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, an enhanced Cell-ID (E-CID) positioning technique may provide a position fix faster than using observed time difference of arrival (OTDOA) positioning techniques that rely on acquisition of three positioning reference signals (PRSs), but with less accuracy or certainty. In one implementation of E-CID, a range between a mobile device and base station (e.g., an eNodeB base station) may be estimated based, at least in part, on a timing advance parameter obtained based, at least in part, on one or more signals transmitted from the mobile device to the base station on an uplink channel.

Using E-CID positioning, a locus of a location of a mobile device may be determined based, at least part, on a measured distance between the mobile device and a base station and a known location of the base station. For example, such a distance measured between the mobile device and a base station of a primary cell may be determined a timing advance parameter based on transmission from the mobile device on an uplink channel to the base station of the primary cell. However, a locus of a location of the mobile device based on a timing advance parameter based on to a base station of a primary cell may have a greater uncertainty than a locus of a location of the mobile device based on a timing advance parameter determined from transmission of a signal on an uplink channel to a base station that is nearer to the mobile device.

According to an embodiment, a mobile device in a cellular network may be capable of obtaining timing advance parameters based on signals transmitted to multiple different base stations through different uplink channels. In determining a locus of locations using an E-CID positioning technique, in an implementation, a mobile device may select a timing advance measurement from among multiple different timing advance measurements based, at least in part, on a determination of a base station that is nearest to the mobile device. This may enable a determination of a locus of locations of the mobile device having a reduced uncertainty.

Referring to FIG. 1, an architecture 101 for supporting positioning of a mobile device such as UE 100 with 3GPP Long Term Evolution (LTE) access for a network 150 is shown. The network 150 may comprise an Evolved Packet System (EPS) that supports LTE access (e.g., by UE 100) and possibly other access types such as CDMA2000, Wideband CDMA (WCDMA) and/or WiFi, just to name a few examples. A UE 100 may communicate with a base station such as a serving evolved Node B (eNodeB or eNB) 102 in a radio access network (RAN) to access communication services from the network 150. The RAN may include other network entities not shown in FIG. 1 for simplicity and may also be referred to as an Evolved Universal Terrestrial Radio Access Network (E-UTRAN). The eNB 102 may also be referred to as a Node B, a base station, an access point, etc. The UE 100 may (i) receive signals from eNB 202 and from other base stations (e.g. other eNBs) and access points (APs) in network 150; (ii) obtain the identities of the source eNBs and other base stations or of the source cells from the received signals and/or (iii) obtain measurements of the received signals such as measurements of time of arrival (TOA), RSTD for OTDOA positioning, pilot phase for AFLT positioning, and/or signal strength (e.g. received signal strength indication (RSSI)), signal quality (e.g. signal to noise ratio (S/N)), and/or timing advance parameters for enhanced cell ID (E-CID) positioning. The eNB, base station and/or cell identities and the different signal measurements may be used to derive a location estimate and/or locus of possible locations or estimated locations for UE 100 (e.g., by UE 100 or by a location server such as E-SMLC 108 or SLP 132). While only one eNB 102 is depicted in FIG. 1, the architecture 101 (e.g., network 150) may include multiple eNBs and/or other base stations and/or APs, each with one or more antenna systems such as used with Distributed Antenna Systems (DAS), Remote Radio Heads (RRHs), repeaters and relays.

The eNB 102 may communicate with a serving MME 104 for UE 100, which may perform various control functions such as mobility management, gateway selection, authentication, bearer management, etc. MME 104 may communicate with an Evolved Serving Mobile Location Center (E-SMLC) 108 and a Gateway Mobile Location Center (GMLC) 106. The E-SMLC 108 may support UE-based, UE-assisted, network-based and/or network-assisted positioning methods for UEs including UE 100 and may support one or more MMEs. E-SMLC 108 may support the 3GPP control plane location solution for LTE access as defined in 3GPP technical Specifications (TSs) 23.271 and 36.305. The E-SMLC 108 may also be referred to as a location server (LS), a Stand Alone SMLC (SAS), etc. The GMLC 106 may perform various functions to support location services and provide services such as subscriber privacy, authorization, authentication, billing, etc. A Location Routing Function (LRF) 130 may communicate with GMLC 106 and may route or help route IP-based emergency calls to a Public Safety Answering Points (PSAPs) such as the i3 ESlnet 142 and i3 PSAP 144, and well as legacy systems such as the legacy ES network 146 and the legacy PSAP 148. LRF 230 may also support location requests from PSAPs (e.g., PSAPs 144 and 148) for UEs (e.g., UE 100) that are making emergency calls and may obtain locations for these UEs and return the locations to the requesting PSAPs. In order to support the routing and location functions that LRF 130 performs, LRF 130 may be configured to request the locations of different target UEs (e.g. UE 100) from a GMLC such as GMLC 106. In that case, GMLC 106 may transfer any location request for a target UE (e.g., UE 100) to an MME such as MME 104 which may transfer the request to an E-SMLC such as E-SMLC 108. The E-SMLC (e.g., E-SMLC 108) may then obtain location related measurements for the target UE from the serving eNB for the target UE and/or from the target UE, compute or verify any location estimate for the target UE and return the location estimate via the MME and GMLC (e.g., MME 104 and GMLC 106) to LRF 130. LRF 130 may also or instead be configured to request the locations of different target UEs (e.g., UE 100) from a SUPL Location Platform (SLP) such as SLP 132 described next. SLP 132 may include a SUPL Positioning Center (SPC) 134 and a SUPL Location Center (SLC) 136, and may be configured to communicate location information with the LRF 130 and support the SUPL user plane location solution defined by the Open Mobile Alliance (OMA) in order to obtain the locations of UEs such as UE 100. In order to support positioning of a UE such as UE 100, E-SMLC 108 and SLP 132 may each use the LTE Positioning Protocol (LPP) defined in 3GPP 36.355 and/or the LPP Extensions (LPPe) protocol defined by OMA in which LPP and/or LPPe messages are exchanged between E-SMLC 108 or SLP 132 and the target UE (e.g., UE 100) that is being positioned. In the case of E-SMLC 108, LPP and/or LPPe messages exchanged with a target UE may be transferred as signaling via the serving MME and serving eNB for the target UE (e.g., eNB 102 and MME 104 if the target UE is UE 100). In the case of SLP 132, LPP and/or LPPe messages exchanged with a target UE may be transferred as data using IP transport via a PDN Gateway, Serving Gateway and serving eNB for the target UE (e.g., PDN Gateway 118, Serving Gateway 116 both described next and eNB 102 if the target UE is UE 100).

A Serving Gateway 116 may perform various functions related to IP data transfer for UEs such as data routing and forwarding, mobility anchoring, etc. A Packet Data Network (PDN) Gateway 118 may perform various functions such as maintenance of data connectivity for UEs, IP address allocation, etc. An IP Multimedia Subsystem (IMS) 160 for network 250 may include various network entities to support IMS services such as Voice-over-IP (VoIP) calls and VoIP emergency calls. The IMS 160 may include a Proxy Call Session Control Function (P-CSCF) 120, a Serving Call Session Control Function (S-CSCF) 122, an Emergency Call Session Control Function (E-CSCF) 224, a Breakout Gateway Control Function 140, a Media Gateway Control Function (MGCF) 138, an Interconnection Border Control Function (IBCF) 126, a Routing Determination Function (RDF) 128 and the LRF 130.

In operation, the network 150 may utilize LTE interfaces and protocols for control plane location. The LPP protocol combined with the LPPe protocol may be used over the Uu interface between the UE 100 and the eNB 102 for positioning of the UE 100 by the E-SMLC 108. LPP/LPPe messages may be transferred (as previously described) between the UE 100 and the E-SMLC 108 via the MME 104 and the eNB 102 for the UE 100 as described in 3GPP TSs 23.271 and 36.305. The E-SMLC 108 may be configured to request (e.g., by sending an LPP/LPPe Request Location Information message to UE 100), and the UE 100 may be configured to provide (e.g., by sending an LPP/LPPe Provide Location Information message to E-SMLC 108) the signal measurements (e.g., RSSI, RTT, RSTD measurements), timing advance parameters and identities of visible cells.

In an alternative embodiment, either (i) the LPP protocol alone without LPPe or (ii) the RRC protocol defined in 3GPP 36.331 may be used over the Uu interface between the UE 100 and the serving eNB 102 for positioning of the UE 100 by the E-SMLC 108. In the case of LPP (alternative (i)), LPP messages may be transferred between the UE 100 and the E-SMLC 108 via the MME 104 and the serving eNB 102 for the UE 100 as described in 3GPP TSs 23.271 and 36.305. In the case of RRC (alternative (ii)), RRC messages may be transmitted between UE 100 and serving eNB 102, and LTE Positioning Protocol A (LPPa) messages (defined in 3GPP TS 36.455) may be transferred between eNB 102 and E-SMLC 108 via the MME 104 for the UE 100 as described in 3GPP TSs 23.271 and 36.305. In an example, E-SMLC 108 may be configured to request (e.g., by sending an LPP Request Location Information message to UE 100 or an LPPa request message to eNB 202, which may prompt eNB 202 to send an RRC request message to UE 100), and the UE 100 may be configured to provide (e.g., by sending an LPP Provide Location Information message to E-SMLC 108 or an RRC response to eNB 202 which causes eNB 202 to send an LPPa response to E-SMLC 208) the signal measurements (e.g., RSTD measurements) and identities of visible cells.

A Location Services (LCS) Application Protocol (LCS-AP) defined in 3GPP TS 29.171 may be used over an SLs interface between the MME 104 and the E-SMLC 108 to enable the MME 104 to request location information for the UE 100 from the E-SMLC 108 using the 3GPP control plane solution. An Evolved Packet Core (EPC) LCS Protocol (ELP) defined in 3GPP TS 29.172 may be used over an SLg interface between the MME 104 and the GMLC 106 to enable the GMLC 106 to request and obtain location information for the UE 100 using the 3GPP control plane solution.

The network 150 may also utilize interfaces and protocols for SUPL User Plane Location. A Lup interface as defined in OMA-AD-SUPL-V2_0 may be used between the UE 100 (referred to as a SUPL Enabled Terminal (SET)) and the SLP 132 to support positioning of the UE 100 using the OMA SUPL user plane solution. The Lup interface may enable exchange of User Plane Location Protocol (ULP) messages, defined in OMA-TS-ULP-V2_0_3, between the UE 100 and the SLP 132. SLP 132 may comprise a Home SLP (H-SLP) and reside in a home network of a UE (e.g., applicable to UE 100 if network 150 is the home network for UE 100) or may be a Discovered SLP (D-SLP) or Emergency SLP (E-SLP). A D-SLP may be used to position UE 100 in any network (e.g., applicable if network 150 is not the home network for UE 100) and an E-SLP may be used to position UE 100 if UE 100 is establishing or has established an emergency call (e.g., a VoIP emergency call via IMS 160 to i3 PSAP 144 or legacy PSAP 148). SLP 132 is split into the SLC 136 and the SPC 134 which may be separate logical functions of a single physical SLP 132 or separate physical entities. The SLC 136 is configured to establish and control a SUPL session with the UE 100. The SPC 134 is configured to obtain a location of the UE 100. The endpoint for any ULP message is then either the SLC 136 or the SPC 134 depending on whether the ULP message is used for control and service provision or for positioning. In the case of the UE 100 (e.g., with LTE access), the ULP messages used for positioning typically each encapsulate one or more LPP messages. Each encapsulated LPP message can further encapsulate one LPPe message, thereby enabling exchange of LPP and/or LPP/

LPPe positioning protocol messages between UE 100 and SLP 132 as previously described. To support heightened accuracy location, LPP/LPPe may be used to enable the SPC 134 to request, and the UE 100 to return the same information (e.g., cell identities and RSTD measurements) as described for control plane location described above.

According to an embodiment, and as described in greater detail below, a mobile device (e.g., a UE) may receive one or more messages from a server comprising positioning assistance data for a downlink terrestrial positioning method. In addition, positioning assistance data may identify a plurality of cell transceivers and specify additional parameters descriptive of identified cell transceivers, including locations of the identified cell transceivers. The mobile device may then apply a particular processing to receive signals based, at least in part, on the additional parameters descriptive of the identified cell transceivers.

According to an embodiment, a UE may make multiple measurements involving radio sources—e.g. by using the cells associated with the radio sources a reference cell or neighbor cells for OTDOA. A location server can then receive OTDOA measurements from the UE that comprise measurements of reference signal time differences (RSTDs). As defined in 3GPP TS 36.214, an RSTD measurement is a measurement of a difference between the signal (e.g., PRS) time of arrival (TOA) from the reference cell at the UE and the TOA from any neighbor cell at the UE.

Figure 2:
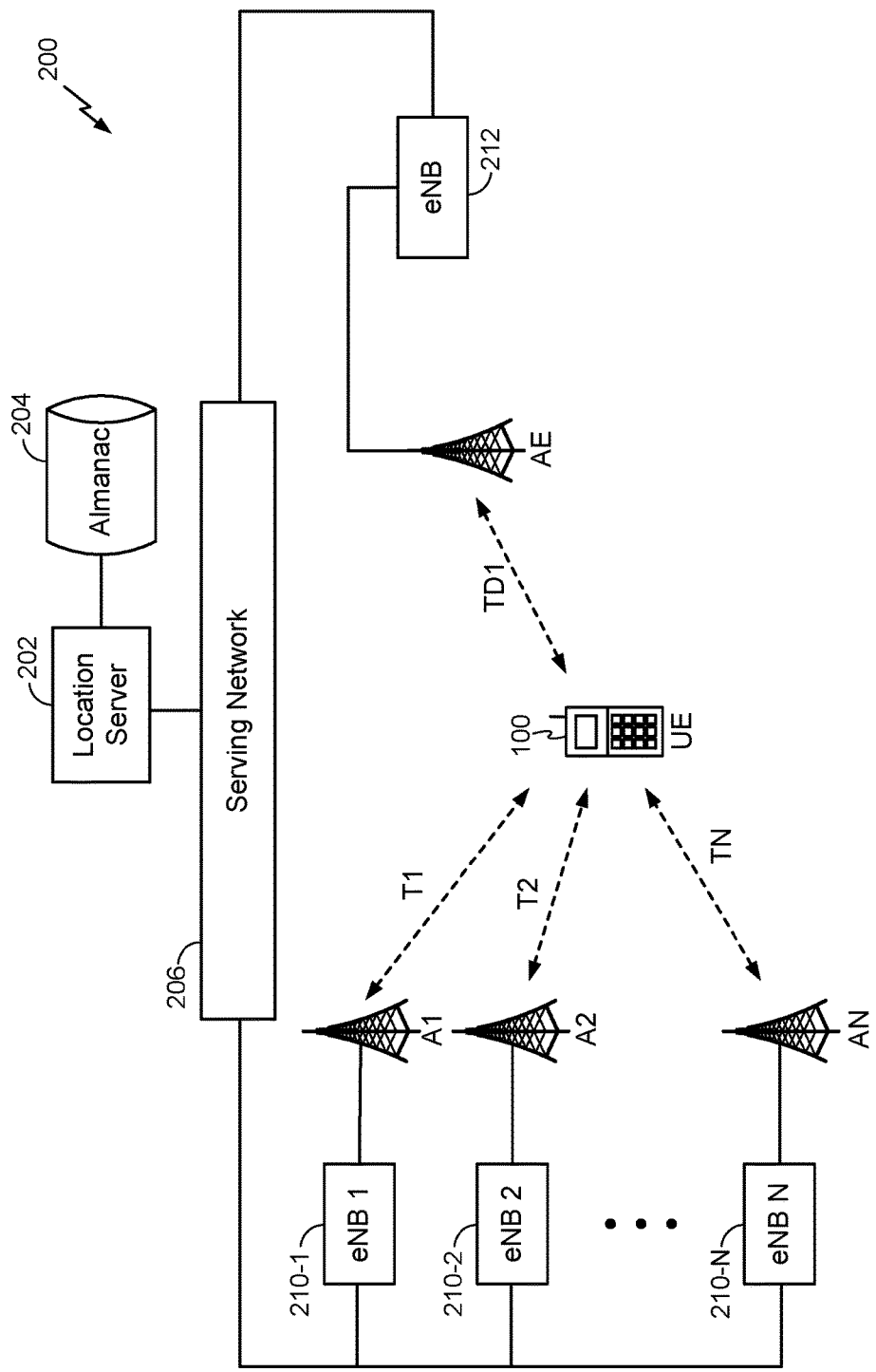
FIG. 2 is a schematic diagram of an architecture of an example wireless communication network for support positioning according to an embodiment.

FIG. 2 shows an example of the system shown in FIG. 1 including a wireless communication system 200 employing LTE access. The wireless communication system 200 includes a location server 202 and an almanac 204. The location server 202 and almanac 204 may be included as part of a serving network 206 or may be attached to or reachable from a serving network 206. For example, the serving network 206 may correspond to network 150 in FIG. 1, and the location server 202 may correspond to E-SMLC 108 or to SLP 132 in network 150 or may be another location server such as a Standalone Serving Mobile Location Center (SAS). The serving network 206 may include one or more access points such as eNB 1 210-1, eNB 2 210-2, eNB N, 210-N, and eNB 212. There may be other eNBs not explicitly shown in FIG. 2 such as eNBs n 210-*n* with n between 3 and N−1. Any one of the access points (e.g., eNB 212) may correspond to eNB 102 in FIG. 1. Each of the access points may be operably connected to one or more antennas. The antennas comprise A1, A2, . . . AN in the case of eNBs 210-1, 210-2 . . . 210-N, respectively, and AE in the case of eNB 212. An almanac 204 represents a database structure which may belong to serving network 206 and/or to location server 202 and may, in some embodiments, be part of location server 202 (e.g., contained in a storage medium in location server 202). Almanac 204 is configured to store identification and location parameters for the access points and base stations (e.g., eNBs) and antennas within the serving network 206 and may comprise a BSA of the type previously described here.

FIG. 2 shows N eNBs 210-1, 210-2, . . . , 210-N and 212 that each support a single cell using a single antenna labelled A1, A2 to AN, and AE. It should be understood that in other implementations, a base station may employ multiple antennas. Antennas A1, A2 to AN, and AE may support transmission of signals between UE 100 and eNBs 210-1, 210-2, . . . , 210-N and 212 through wireless links T1, T2, . . . , TN and TD1, which may support uplink and downlink channels. As described below, UE 100 may determine one or more timing advance parameters based, at least in part, on signals transmitted on signals transmitted by UE 100 on uplink channels and processing frames received on downlink channels that are transmitted by eNBs in response to the signals transmitted in the uplink channels. Based, at least in part, on timing advance parameters determined at UE 100, a locus of possible locations or location estimates of UE 100 may be determined. In one implementation, such a locus of possible locations or location estimates may be determined at UE 100. In an alternative implementation, UE 100 may transmit determined timing advance parameters in one or more messages to location server 202 to enable location server 202 to determine such a locus of possible locations or location estimates.

Figure 3:
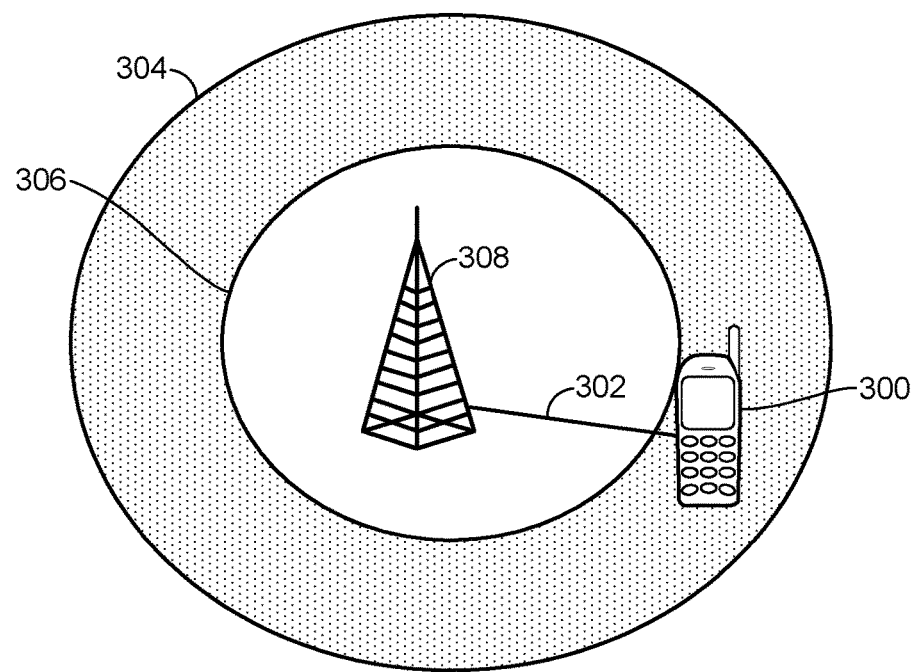
FIGS. 3 and 4 are schematic diagrams illustrating determinations of a locus of an estimated location of a mobile device according to an embodiment.

FIG. 3 is a schematic diagram illustrating a coverage area 304 of a cell in a wireless cellular network served by a base station 308 according to an embodiment. In an implementation of E-CID, a distance 302 between a mobile device 300 and base station 308 in combination with a location of base station 308 may be used to define a locus 306 of possible locations (or estimated locations) of mobile device 300. For example, locus 306 may be determined as a circle centered at a known location of base station 308 and having a radius of distance 302.

A recent release of 3GPP standard specifies an uplink carrier aggregation (ULCA) mode that enables a mobile device to transmit multiple uplink signals to multiple different neighboring base stations. (See, e.g., 3GPP ref. 36.860 for "LTE-Advanced dual uplink inter-band Carrier Aggregation (CA)") Furthermore, multiple timing advance parameters may be obtained by transmission by a mobile device of signals to multiple different base stations on the multiple different uplink channels (e.g., in an LET Random Access Procedure (RACH)). Ranges between the mobile device and the different base stations may be measured or estimated based, at least in part, on the obtained timing advance parameters.

In one technique for E-CID positioning, a range to a base station may be determined to be a range based on a timing advance parameter from transmission of a signal on an uplink channel to a base station of a primary cell (e.g., serving cell), regardless of an expected distance or approximate distance between the mobile device and the base station of the primary cell, or regardless of whether the base station of the primary cell is closest to the mobile device among base stations for which the mobile device has obtained recent timing advance parameters. In the particular example of FIG. 3, base station 308 may comprise a base station of a primary cell and locus 306 may be centered about the center of the primary cell (e.g., centered about a known location of base station 308).

Figure 4:
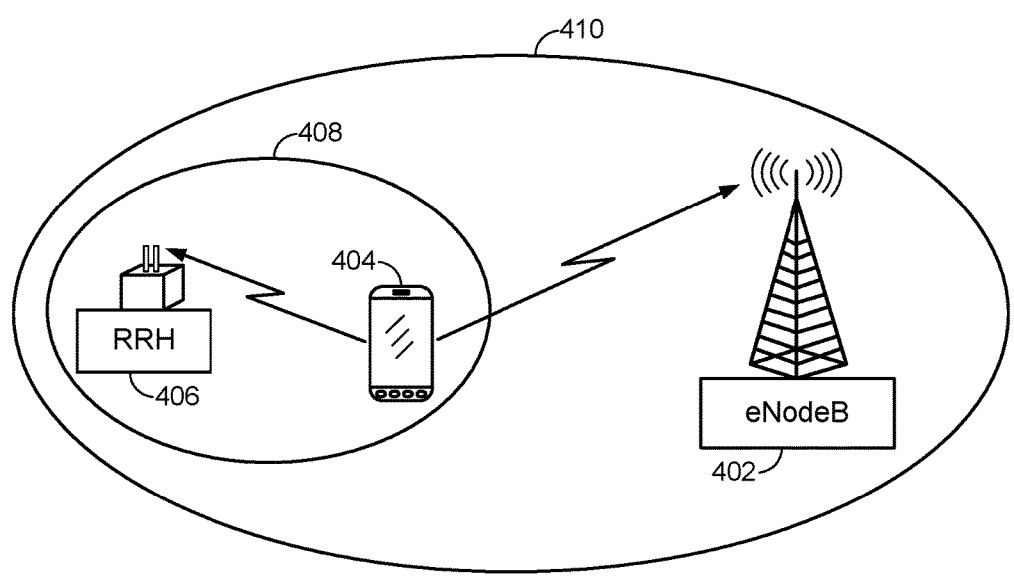

However, a timing advance parameter obtained from transmission of a signal on an uplink channel to the base station of a primary cell may not be an optimal timing advance parameter among available timing advance parameters obtained from uplink channels to base stations (e.g., including base stations other than the base station of the primary cell). For example, as illustrated in FIG. 4, a mobile device 404 may obtain timing advance parameters from signals transmitted in a first uplink channel to a base station 402 of a primary cell and timing advance parameters based on signals transmitted in a second uplink channel to a base station 406 serving a cell that is not a primary cell (e.g., a secondary cell). As may be observed, base station 406 may be closer to mobile device 406 than base station 402 of a primary cell. As illustrated in FIG. 3, an estimated range to a base station based on timing advance parameters may be used to determine a locus of possible locations or estimated locations of a mobile device along a circle. A shorter range between a base station and a mobile device may provide a smaller locus of possible locations, providing a more accurate or less certain location estimate using E-CID. As pointed out above, a mobile device may obtain timing advance parameters based on signals transmitted on uplink channels to multiple different base stations (e.g., uplink channels to base stations 402 and 406). According to an embodiment, in determining a locus of an estimated location of a mobile device, a computing device may select a timing advance parameter from among multiple timing advance parameters based on signal transmissions in uplink channels to multiple different base stations. In one particular implementation, a timing advance parameter obtained from transmission of a signal on an uplink channel to a particular base station may be selected if the particular base station is determined to be the nearest (or expected to be nearest) to the mobile device. This may lead to a smaller locus of the estimated location of the mobile device.

A distance between mobile device 404 and either base station 402 or base station 406 may be determined based, at least in part, on timing advance parameters determined from transmission of signals on uplink channels to base stations 402 and 406. In one embodiment, mobile device 404 may determine an estimated or measured range to base station 402 or 406 based, at least in part, on a known transmission power of a downlink signal and a received transmission power of the downlink signal using a path loss computation, for example. Mobile device 404 may refine or adjust such an estimated or measured range to base station 402 or 406 based, at least in part, on timing advanced parameters received in timing advance commands. For example, a timing advance command may comprise a field expressing a timing advance index value $T_A$ of 0 to 1282 for specifying a size of an adjustment to be made in the timing of messages in an uplink channel (e.g., in increments of 16.0 psec). The size of adjustment to be made to timing of messages in the uplink channel may then be used to compute an adjustment to a current estimate or measurement of range to base station 402 or 406.

As may be observed from FIG. 4, a locus 408 of possible locations of mobile device 404 based on a location of base station 406 and a measured distance between mobile device 404 and base station 406 may be smaller than locus 410 based on a location of base station 402 and a measured distance between mobile device 404 and base station 402. Accordingly, locus 408 is associated with less uncertainty in the location of mobile device 404 than locus 410.

According to an embodiment, mobile device 404 may obtain timing advance parameters based on signal transmissions in uplink channels to multiple different base stations (e.g., base stations 402 and 406). According to an embodiment, in determining a locus of possible locations of a mobile device, a particular base station, and associated timing advance parameter, may be selected from among the multiple base stations based, at least in part, on an estimated range from the mobile device to the base station. For example, in one particular implementation, the particular base station may be selected based, at least in part, on an estimated path loss. In one example, such an estimated path loss may be determined based, at least in part, on a strength of a signal received on an uplink channel (e.g., a Random Access Preamble in a RACH process) measured at a base station. In another example, an estimated path loss may be determined based, at least in part, on a strength of a signal received on a downlink channel (e.g., a Random Access Response message) measured at a mobile station.

Figure 5:
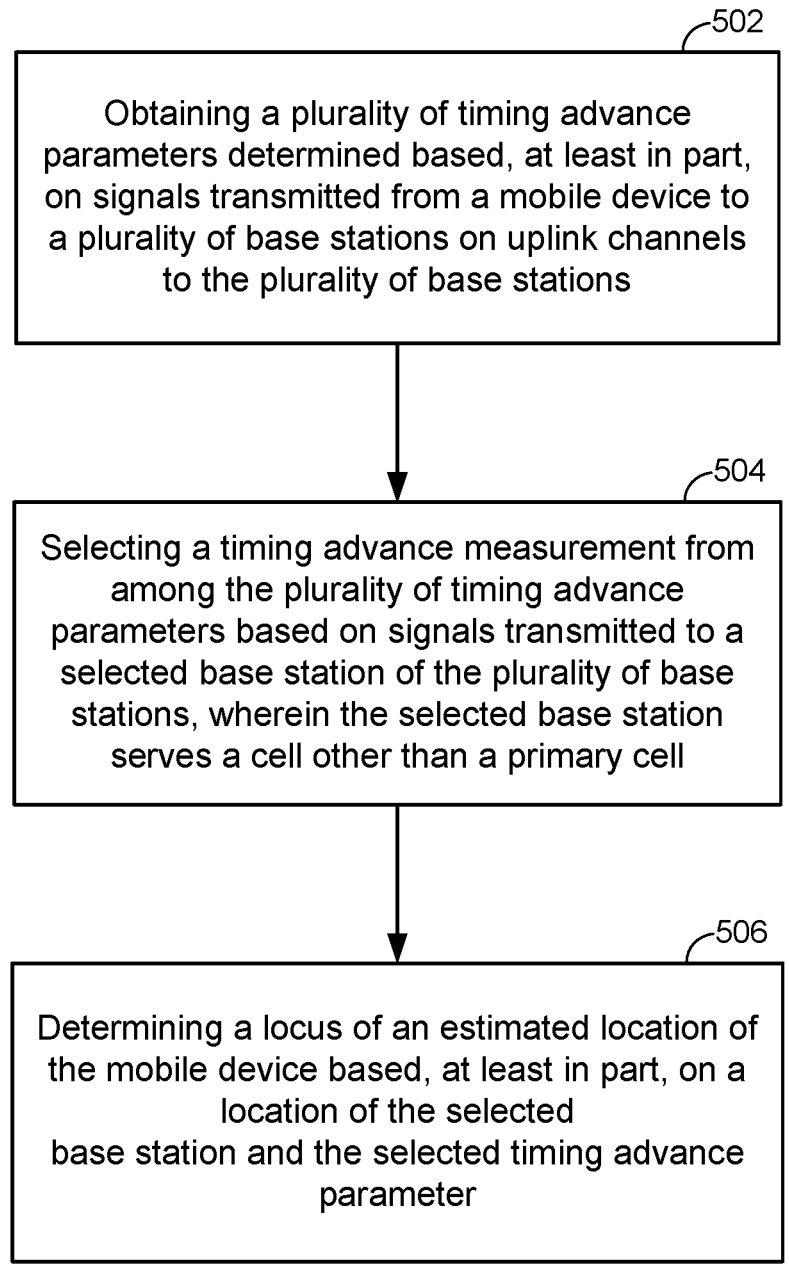
FIG. 5 is a flow diagram of a process to determine a locus of possible locations or estimated locations of a mobile device according to an embodiment.

FIG. 5 is a flow diagram of a process for determining a locus of an estimated location of a mobile device according to an embodiment. In this context, a "locus of an estimated location" as referred to herein means a set of points on which a location or estimated location may exist. In an example, a locus of an estimated location may comprise a curve or closed curve such as a circle, ellipse, etc. to model possible locations or estimated locations. A locus of an estimated may comprise, or be expressed by, parameters by which a set of points may be uniquely determined. For example, an locus of a location or estimated location of a mobile device may be expressed or represented by parameters such as a center of a circle (e.g., location of a base station) and a radius of the circle (e.g., distance based, at least in part, on a selected timing advance parameter). It should be understood, however, that these are merely examples of a set of points that may provide a locus of an estimated location, and claimed subject matter is not limited in this respect. According to an embodiment, the actions shown in FIG. 5 may be performed, by a computing device such as a computing device at a mobile device (e.g., UE 100) or server (e.g., location server 202).

At block 502 a plurality of timing advance parameters may be obtained based, at least in part, on signals transmitted from a mobile device to a plurality of base stations on uplink channels. In this context, a "timing advance parameter" as referred to herein means a parameter that may be applied by a mobile device to affect the timing of transmitting frames in an uplink channel to a base station that is based, at least in part, on a measured signal propagation delay. In one non-limiting example, a timing advance parameter may comprising a timing offset relative to a reference time. In one example implementation, a timing advance parameter may be determined or updated at a mobile device based on a timing advance command received from the base station in a downlink frame. Such a timing advance command may specify, for example, an adjustment to be applied to subsequent frames to be transmitted in an uplink channel. It should be understood, however, that these are merely examples implementations of a timing advance parameter, and that claimed subject matter is not limited in this respect.

In a particular implementation, a mobile device may operate in an LTE carrier network that has implemented uplink carrier aggregation (ULCA) employ the mobile device to receive downlink messages from multiple different base stations contemporaneously. From time to time a mobile device operating in an implementation of ULCA may transmit messages on any one of multiple different uplink channels to different base stations. To facilitate the timing and synchronization of such messages on different uplink channels, the mobile device may obtain timing advance parameters based, at least in part, on signals transmitted on the different uplink channels. In one implementation, a mobile device operating in an implementation of ULCA may transmit a Random Access Preamble in an LTE Random Access Procedure (RACH) on uplink channels to multiple different base stations. In response to transmission of a Random Access Preamble from a mobile device, a base station may transmit a Random Access Response message. The mobile device may receive Timing Advance Commands in Random Access Response frames in downlink channels from the multiple different base stations. Based, at least in part, on the received Timing Advance Commands, the mobile device may determine corresponding timing advance parameters (e.g., that may be used to synchronize transmission of subsequent uplink frames).

In an embodiment of ULCA, a mobile device may designate one base station as serving a primary cell while other base stations may serve secondary cells such that the mobile device may access service on an uplink channel to the primary cell and receive messages in downlink channels from the primary cell and the secondary cells. In this context, a "primary cell" as referred to herein means a cell in a cellular communication network on which a mobile device currently operates over an uplink connection on a primary frequency in an established initial connection or a connection re-established in a handover procedure. In a particular implementation, a mobile device may establish a radio resource control (RRC) connection to a primary cell exclusively of other cells in communication with the mobile device. It should be understood, however, that this is merely an example implementation of a primary cell and claimed subject matter is not limited in this respect. A "secondary cell" as referred to herein means a cell in a cellular communication network operating on a secondary frequency which may be configured for uplink communication (e.g., as a primary cell) by establishment of a radio resource control (RRC) connection.

As pointed out above, timing advance parameters may be obtained from transmission of signals in uplink channels to primary and secondary cells to support synchronization of subsequent frames on uplink channels to the primary and secondary cells. Block 504 may select a timing advance parameter based on a signal transmitted in an uplink channel to a particular base station from among the plurality of timing advance parameters obtained at block 502. As pointed out above in connection with block 502, the selected timing advance parameter may be based, at least in part, on signals transmitted (e.g., Random Access Preamble) to a base station of a particular cell other than a primary cell (e.g., as part of a RACH procedure). As discussed above in connection with FIG. 4, for example, a mobile device 404 may communicate with base station 402, which may serve a primary cell having an RRC connection with mobile device 404, and communicate with base station 406 (e.g., serving a secondary cell). Mobile device 404 may obtain different timing advance parameters by transmission of a Random Access Preamble on uplink channels to base stations 402 and 406, and receiving timing advance commands in Random Access Response frames transmitted in response.

While base station 406 may serve a cell that is a secondary cell to mobile device 404, base station 406 may nevertheless be located closer to mobile device 404 than base station 402. According to an embodiment, block 504 may select a timing advance parameter based on a Random Access Preamble transmitted from mobile device 404 to base station 406 if base station 406 is determined to be closer to mobile device 404 than base station 402. In one embodiment, block 504 determine that the particular base station is nearest based, at least in part, on parameters indicative of a distance or range separating the mobile device and the particular base station. For example, block 504 may determine that the particular base station is nearest based, at least in part, on an estimated path loss on an uplink channel or downlink channel between the mobile device and the particular base station as discussed above.

In another implementation, block 504 may select a timing advance parameter from among multiple timing advance parameters based, at least in part, on an expected frequency at which the selected timing advance parameter may be updated. In certain scenarios, for example, a base station estimating an arrival time of an uplink signal transmitted by a mobile device may not be capable of computing an associated timing advance parameter if the mobile device is not sending some uplink data (e.g., PUSCH/PUCCH/SRS symbols). This condition may occur, for example, in the absence of transmission from the mobile device on an uplink signal to a base station of a primary cell (e.g., Tune Away Gap in MSIM, no grant on that carrier etc.). As such, a timing advance parameter based on the uplink signal to the base station of the primary cell may not be updated, leading to stale location determination.

In a particular implementation, a mobile device may select a timing advance parameter at block 504 other than a timing advance value based uplink signals transmitted to a base station of a primary cell if the mobile device deduces an absence of transmission of uplink signals transmitted to the base station of the primary cell. A mobile device may make such a deduction, for example, by decoding a PDCCH symbol received on a downlink signal to determine four frames in advance if there will be active transmission (e.g. of PUSCH symbols) on a corresponding uplink channel. In this particular scenario in which a mobile device determines the absence of a grant of transmission resources on an uplink channel to a base station of a primary cell, at block 504 the mobile device may select a timing advance parameter based on one or more signals transmitted on an uplink channel to a base station serving a cell other than the primary cell. If there are available multiple timing advance parameters based on signals transmitted on uplink channels to base stations serving cells other than the primary cell, the mobile device may select a particular timing advance parameter from among the multiple timing advance parameters that is based on a signal on an uplink channel to a base station that is determined to be nearest as described above.

As discussed above, in particular embodiments, block 504 may be directed to a mobile device selecting a timing advance parameter that is based on signals transmitted on an uplink channel to a base station that is determined to be nearest to the mobile device. If, for example, a mobile device determines that multiple base stations (corresponding to multiple timing advance parameters) are indistinguishably nearest (e.g., multiple base stations that are separated from the mobile device by about the same distance), the mobile device may at block 504 select a timing advance parameter from among the multiple timing advance parameters, at least in part, on an expected frequency at which the selected timing advance parameter may be updated.

Block 506 may determine a locus of locations or estimated locations of a mobile device based, at least in part, on the timing advance parameter selected in block 504 and a location of the particular base station selected at block 504. If, for example, block 504 selects a timing advance parameter based, at least in part, on a Random Access Preamble transmitted from mobile device 404 to base station 406, block 506 may determine a locus as locus 408 based, at least in part, on a location of base station 406 and the selected timing advance parameter. For example, block 506 may determine such a locus as a circle centered at the location of base station 406 and having a radius of a range to mobile device 404 computed based on the selected timing advance parameter. As discussed above, such a range between mobile device 404 and base station 406 may be determined based on an initial range estimated from a path loss computation, followed by adjustments based on timing advance parameters obtained in timing advance commands. It should be understood, however, that this is merely an example of a particular form of a locus of locations or estimated locations of a mobile device, and claimed subject matter is not limited in this respect.

In some applications, a previous estimated location of a mobile device (e.g., determined using OTDOA, processing of GNSS signals, or other techniques identified above) may be sufficiently reliable or accurate to satisfy a request for a current estimated location of the mobile device. In one particular application, in response to an emergency event, i3 PSAP 144 or legacy PSAP 148 may initiate an E911 request to UE 100 to provide an early position fix to be followed by a more robust final position fix. According to an embodiment, in lieu of selecting a timing advance parameter at block 504 and determining a locus of an estimated location of a mobile device at block 506, a computing device may determine whether a previous position fix is sufficiently reliable or accurate based, at least in part, on timing advance parameters obtained at block 502. For example, in response to an E911 request to provide an early position fix, UE 100 may analyze timing advance parameters obtained since a most recent position fix (stored in memory) to detect whether there has been significant motion of UE 100 since the most recent position fix. This may be determined based, at least in part, on a comparison of past timing advance parameters with current timing advance parameters (e.g., determine whether a difference between past timing advance parameters and current timing advance parameters exceeds a threshold). In response to a determination that there has not been significant motion of UE 100 since the most recent position fix, UE 100 may furnish the stored most recent position fix to satisfy the request for an early position fix.

In certain scenarios as pointed out above, a base station may not allocate uplink resources to a mobile devices which may prevent the mobile device from obtaining a timing advance parameter based on signals transmitted in an uplink channel to the base station. For example, based on uplink resources consumed by applications running on the mobile device (e.g., Whatsapp), scheduling requests (e.g., SR) from the mobile device may be satisfied by use of a small amount of uplink channel resources (e.g., resource blocks (RBs)). With such a small demand for uplink channel resources, a network may allocate small numbers of RBs for uplink transmission on an uplink channel to a single base station. This may undercut an ability to obtain updates of timing advance parameters based on signals transmitted on uplink channels to base stations other than timing advance parameters based on signals transmitted on uplink channels to the single base station. Also following a E-911 voice call, a network may allocate fewer RBs in an uplink channel for some applications to preserve RBs for allocation to the voice call. This may reduce accuracy of positioning operations since timing advance values may be updated with reduced frequency.

According to an embodiment, at block 502 a mobile device may alter a particular ULCA scheduling request to a network by overriding a current scheduling request with a scheduling request for additional uplink capacity. Responsive to the scheduling request for additional uplink capacity, the network may allocate a higher uplink resource grant which may lead to a continuous PUSCH transmission using uplink channels to multiple different base stations. In one particular implementation, a mobile device may attempt to transmit random pilot symbols on additional resource blocks allocated to the mobile device. This may enable immediate update of the TA value almost instantaneously by the network resulting into better location accuracy.

Figure 6:
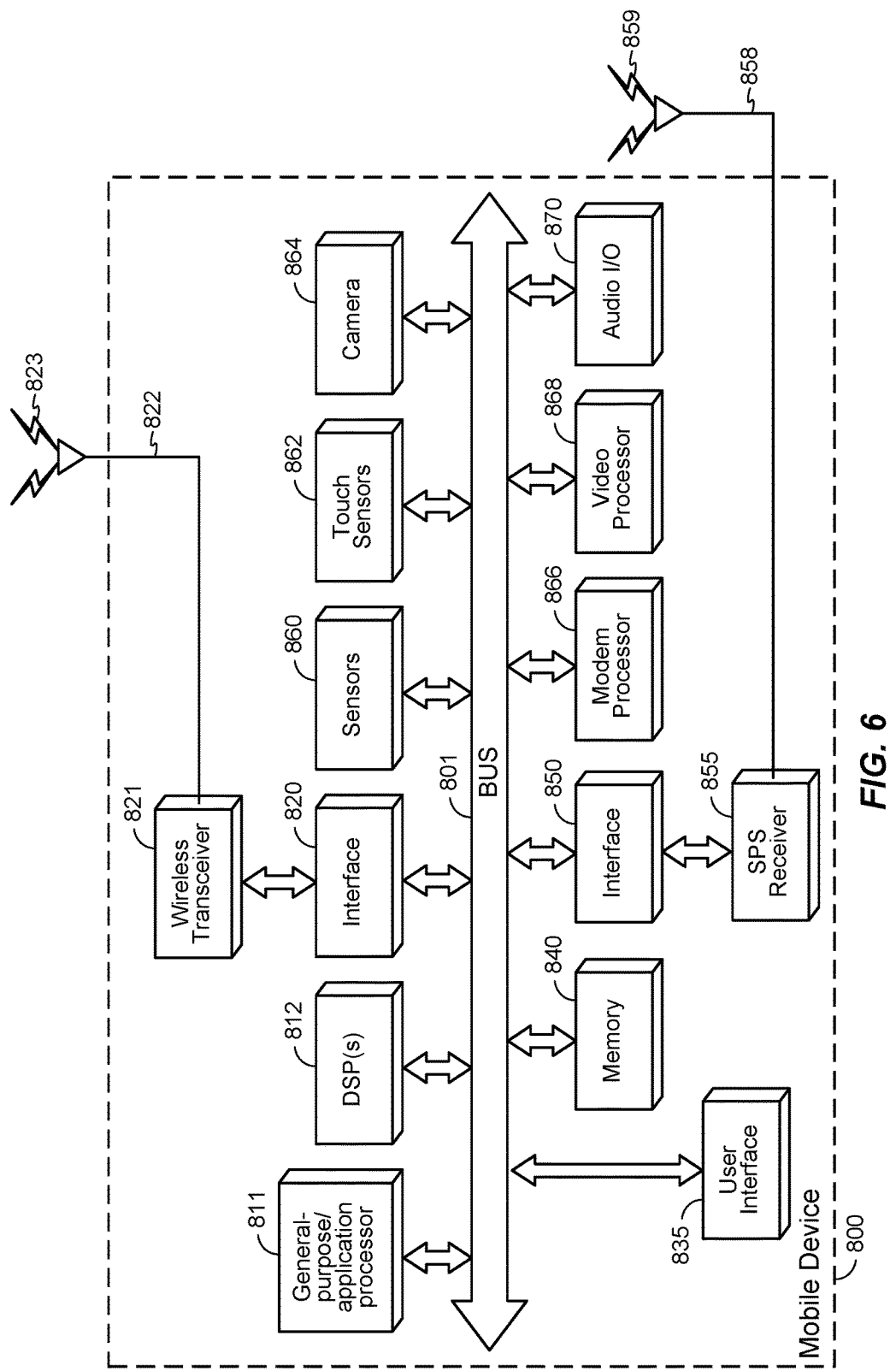
FIG. 6 is a schematic block diagram of a mobile device, in accordance with an example implementation.
Figure 7:
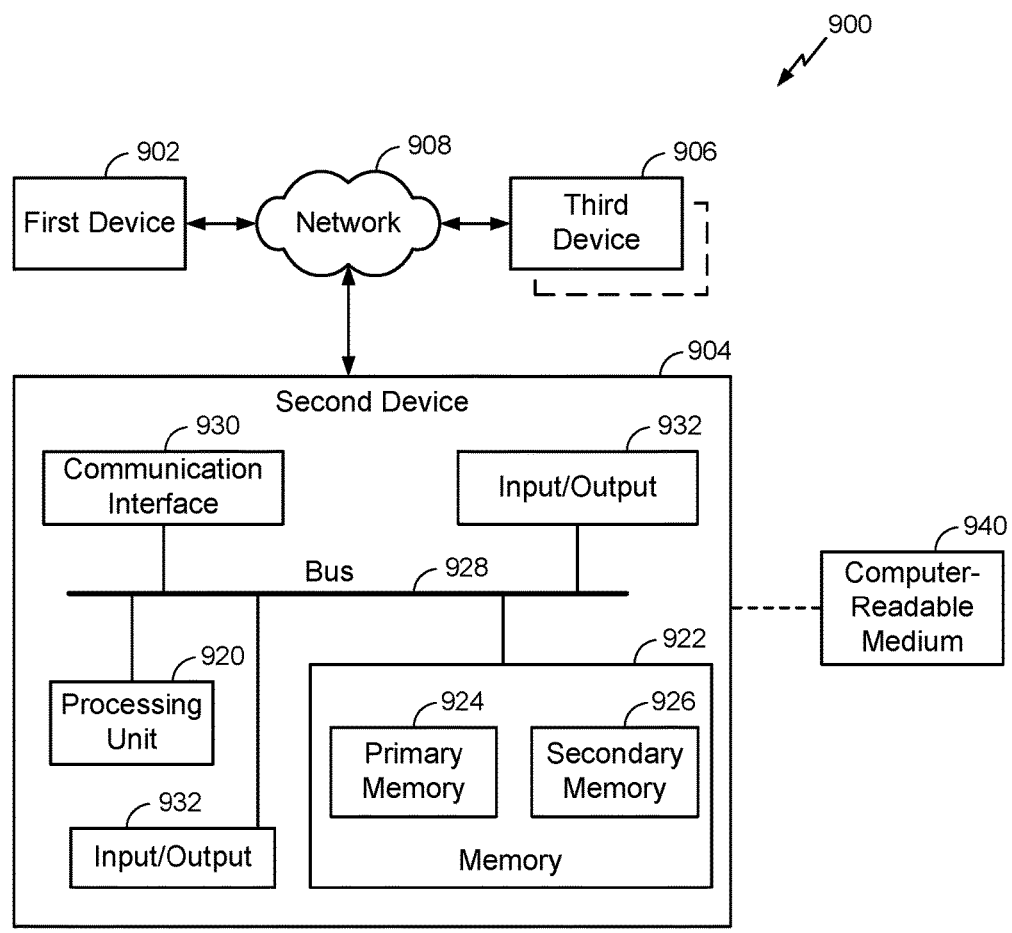
FIG. 7 is a schematic block diagram of an example computing platform in accordance with an implementation.

Subject matter shown in FIGS. 6 and 7 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIG. 5, and corresponding text of the present disclosure.

FIG. 6 is a schematic diagram of a mobile device 800 according to an embodiment. UE 100, mobile device 300 and/or mobile device 400 as shown in FIGS. 1, 2, and 4 may comprise one or more features of mobile device 800 shown in FIG. 6. In certain embodiments, mobile device 800 may comprise a wireless transceiver 821 which is capable of transmitting and receiving wireless signals 823 via wireless antenna 822 over a wireless communication network. Wireless transceiver 821 may be connected to bus 801 by a wireless transceiver bus interface 820. Wireless transceiver bus interface 820 may, in some embodiments be at least partially integrated with wireless transceiver 821. Some embodiments may include multiple wireless transceivers 821 and wireless antennas 822 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 821 may transmit signals on an uplink channel and receive signals on a downlink channel as part of a RACH procedure as discussed above. Also, wireless transceiver 821 may be capable of measuring received power of a signal suitable for measuring a path loss between a transmitter and transceiver 821.

Mobile device 800 may also comprise SPS receiver 855 capable of receiving and acquiring SPS signals 859 via SPS antenna 858 (which may be the same as antenna 822 in some embodiments). SPS receiver 855 may also process, in whole or in part, acquired SPS signals 859 for estimating a location of mobile device 800. In some embodiments, general-purpose processor(s) 811, memory 840, digital signal processor(s) (DSP(s)) 812 and/or specialized processors (not shown) may also be utilized to process acquired SPS signals, in whole or in part, and/or calculate an estimated location of mobile device 800, in conjunction with SPS receiver 855. Storage of SPS, TPS or other signals (e.g., signals acquired from wireless transceiver 821) or storage of measurements of these signals for use in performing positioning operations may be performed in memory 840 or registers (not shown). General-purpose processor(s) 811, memory 840, DSP(s) 812 and/or specialized processors may provide or support a location engine for use in processing measurements to estimate a location of mobile device 800. In a particular implementation, all or portions of actions or operations set forth for process 500 may be executed by general-purpose processor(s) 811 or DSP(s) 812 based on machine-readable instructions stored in memory 840. For example general-purpose processor(s) 811 or DSP(s) 812 may process a downlink signal acquired by wireless transceiver 821 to, for example, determine timing advance parameters and a locus of a location or estimated location as described above.

Also shown in FIG. 6, digital signal processor(s) (DSP(s)) 812 and general-purpose processor(s) 811 may be connected to memory 840 through bus 801. A particular bus interface (not shown) may be integrated with the DSP(s) 812, general-purpose processor(s) 811 and memory 840. In various embodiments, functions may be performed in response to execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions or actions described above in connection with FIG. 5.

Also shown in FIG. 6, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general purpose processor 811 in response to action from a user. Similarly, applications hosted on mobile device 800 may store analog or digital signals on memory 840 to present an output signal to a user. In another implementation, mobile device 800 may optionally include a dedicated audio input/output (I/O) device 870 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression or manipulation of signals representing captured images. Additionally, video processor 868 may decode/decompress stored image data for presentation on a display device (not shown) on mobile device 800.

Mobile device 800 may also comprise sensors 860 coupled to bus 801 which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by DPS(s) 812 or general purpose application processor 811 in support of one or more applications such as, for example, applications directed to positioning or navigation operations.

In a particular implementation, mobile device 800 may comprise a dedicated modem processor 866 capable of performing baseband processing of signals received and downconverted at wireless transceiver 821 or SPS receiver 855. Similarly, modem processor 866 may perform baseband processing of signals to be upconverted for transmission by wireless transceiver 821. In alternative implementations, instead of having a dedicated modem processor, baseband processing may be performed by a general purpose processor or DSP (e.g., general purpose/application processor 811 or DSP(s) 812). It should be understood, however, that these are merely examples of structures that may perform baseband processing, and that claimed subject matter is not limited in this respect.

FIG. 7 is a schematic diagram illustrating an example system 900 that may include one or more devices configurable to implement techniques or processes described above. System 900 may include, for example, a first device 902, a second device 904, and a third device 906, which may be operatively coupled together through a wireless communications network 908. In an aspect, second device 904 may comprise a server or location server, such as LS 126 or standalone LSF 132 in system 101, or location server 202. Also, in an aspect, wireless communications network 908 may comprise one or more wireless access points, for example. However, claimed subject matter is not limited in scope in these respects.

First device 902, second device 904 and third device 906 may be representative of any device, appliance or machine. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a location server, a base station almanac server, a location server function, a base station, or a mobile device in accordance with the examples described herein.

Similarly, wireless communications network 908, may be representative of one or more communication links, processes, or resources configurable to support the exchange of data between at least two of first device 902, second device 904, and third device 906. By way of example but not limitation, wireless communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 906, there may be additional like devices operatively coupled to wireless communications network 908.

It is recognized that all or part of the various devices and networks shown in system 900, and the processes and methods as further described herein, may be implemented using or otherwise including hardware, firmware, software, or any combination thereof.

Thus, by way of example but not limitation, second device 904 may include at least one processing unit 920 that is operatively coupled to a memory 922 through a bus 928.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium. For example, computer-readable medium 940 may store computer readable instructions to, at least in part, perform actions shown in FIG. 5 and discussed above.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a computing device, comprising:
    obtaining a plurality of timing advance parameters determined based, at least in part, on signals transmitted from a mobile device to a plurality of base stations on uplink channels to the plurality of base stations;
    selecting a timing advance parameter from among the plurality of timing advance parameters based on signals transmitted to a selected base station of the plurality of base stations, wherein the selected base station serves a cell other than a primary cell; and
    determining a locus of an estimated location of the mobile device based, at least in part, on a location of the selected base station and the selected timing advance parameter.

2. The method of claim 1, wherein the signals transmitted from the mobile device to the plurality of base stations comprise Random Access Preambles.

3. The method of claim 1, wherein selecting the timing advance parameter from among the plurality of timing advance parameters further comprises determining that the selected base station is nearest to the mobile device among the plurality of base stations.

4. The method of claim 3, and further comprising determining that the selected base station is nearest to the mobile device based, at least in part, on an estimated path loss on an uplink channel from the mobile device to the selected base station.

5. The method of claim 4, and further comprising determining the estimated path loss based, at least in part, on measurements obtained during a RACH process.

6. The method of claim 1, and further comprising detecting motion of the mobile device based, at least in part, on a change in at least one of the plurality of timing advance parameters.

7. The method of claim 1, wherein obtaining the plurality of timing advance parameters comprises receiving one or more messages transmitted from the mobile device containing the plurality of timing advance parameters.

8. The method of claim 1, wherein obtaining the plurality of timing advance parameters comprises:
transmitting Random Access Preambles on uplink channels to the plurality of base stations;
receiving Random Access Response messages transmitted in response to the Random Access Preambles; and
determining the plurality of timing advance parameters based, at least in part, on Timing Advance Commands in the received Random Access Response messages.

9. The method of claim 8, and further comprising obtaining the location of the selected base station from assistance data received in one or more messages.

10. The method of claim 1, wherein selecting the timing advance parameter from among the plurality of timing advance parameters further comprises selecting the timing advance parameter from among the plurality of timing advance parameters based, at least in part, on an expected frequency at which the selected timing advance parameter is updated.

11. The method of claim 1, wherein selecting the timing advance parameter from among the plurality of timing advance parameters further comprises selecting the timing advance parameter from among the plurality of timing advance parameters based, at least in part, on an absence of a grant of transmission resources on an uplink channel to a base station of the primary cell.

12. The method of claim 1, wherein obtaining the plurality of timing advance parameters determined based, at least in part, on signals transmitted from the mobile device to the plurality of base stations on uplink channels to the plurality of base stations further comprises overriding a current scheduling request with a scheduling request for additional uplink capacity.

13. A computing device, comprising:
a memory; and
one or more processors coupled to the memory and configured to:
obtain a plurality of timing advance parameters determined based, at least in part, on signals transmitted from a mobile device to a plurality of base stations on uplink channels to the plurality of base stations;
select a timing advance parameter from among the plurality of timing advance parameters based on signals transmitted to a selected base station of the plurality of base stations, wherein the selected base station serves a cell other than a primary cell; and
determine a locus of an estimated location of the mobile device based, at least in part, on a location of the selected base station and the selected timing advance parameter.

14. The computing device of claim 13, and further comprising a communication interface to receive messages from a communication network, and wherein the one or more processors are further configured to obtain the plurality of timing advance parameters from messages received at the communication interface and transmitted by the mobile device.

15. The computing device of claim 13, and further comprising a wireless transceiver, and wherein the one or more processors are further configured to obtain the plurality of timing advance parameters based, at least in part, on transmitting a Random Access Preambles transmitted by the wireless transceiver on uplink channels to the plurality of base stations and Random Access Response messages and received at the wireless transceiver.

16. The computing device of claim 13, wherein the signals transmitted from the mobile device to the plurality of base stations comprise Random Access Preambles.

17. The computing device of claim 13, wherein the one or more processors are further configured to select the timing advance parameter from among the plurality of timing advance parameters based, at least in part, on a determination that the selected base station is nearest to the mobile device among the plurality of base stations.

18. The computing device of claim 17, wherein the one or more processors are further configured to determine that the selected base station is nearest to the mobile device based, at least in part, on an estimated path loss on an uplink channel from the mobile device to the selected base station.

19. The computing device of claim 18, wherein the one or more processors are further configured to determine the estimated path loss based, at least in part, on measurements obtained during a RACH process.

20. The computing device of claim 13, wherein the one or more processors are further configured to detect motion of the mobile device based, at least in part, on a change in at least one of the plurality of timing advance parameters.

21. The computing device of claim 13, wherein the one or more processors are further configured to obtain the plurality of timing advance parameters from one or more messages transmitted from the mobile device containing the plurality of timing advance parameters.

22. The computing device of claim 13, and further comprising a wireless transceiver, wherein the one or more processors are further configured to:
initiate transmission of Random Access Preambles through the wireless transceiver on uplink channels to the plurality of base stations;
obtain Random Access Response messages received at the wireless transceiver and transmitted in response to the Random Access Preambles; and
determine the plurality of timing advance parameters based, at least in part, on Timing Advance Commands in the Random Access Response messages received at the wireless transceiver.

23. The computing device of claim 22, wherein the one or more processors are further configured to obtain the location of the selected base station from assistance data received in one or more messages at the wireless transceiver.

24. The computing device of claim 13, wherein the one or more processors are further configured to select the timing advance parameter from among the plurality of timing advance parameters based, at least in part, on an expected frequency at which the selected timing advance parameter is updated.

25. The computing device of claim 13, wherein the one or more processors are further configured to select the timing advance parameter from among the plurality of timing advance parameters based, at least in part, on an absence of a grant of transmission resources on an uplink channel to a base station of the primary cell.

26. The computing device of claim 13, wherein the one or more processors are further configured to override a current scheduling request with a scheduling request for additional uplink capacity to obtain at least a portion of the plurality of timing advance parameters.

27. A non-transitory storage medium comprising computer-readable instructions stored thereon which are executable by one or more processors of a computing device to:
obtain a plurality of timing advance parameters determined based, at least in part, on signals transmitted from a mobile device to a plurality of base stations on uplink channels to the plurality of base stations;

select a timing advance parameter from among the plurality of timing advance parameters based on signals transmitted to a selected base station of the plurality of base stations, wherein the selected base station serves a cell other than a primary cell; and determine a locus of an estimated location of the mobile device based, at least in part, on a location of the selected base station and the selected timing advance parameter.

28. The non-transitory storage medium of claim 27, wherein the computer-readable instructions are further executable by the one or more processors of the computing device to:

initiate transmission of a Random Access Preambles on uplink channels to the plurality of base stations;

obtain Random Access Response messages transmitted in response to the Random Access Preambles; and determine the plurality of timing advance parameters based, at least in part, on Timing Advance Commands in the Random Access Response messages.

29. A computing device comprising:

means for obtaining a plurality of timing advance parameters determined based, at least in part, on signals transmitted from a mobile device to a plurality of base stations on uplink channels to the plurality of base stations;

means for selecting a timing advance parameter from among the plurality of timing advance parameters based on signals transmitted to a selected base station of the plurality of base stations, wherein the selected base station serves a cell other than a primary cell; and means for determining a locus of an estimated location of the mobile device based, at least in part, on a location of the selected base station and the selected timing advance parameter.

30. The computing device of claim 29, wherein means for obtaining the plurality of timing advance parameters comprises:

means for transmitting a Random Access Preambles on uplink channels to the plurality of base stations;

means for receiving Random Access Response messages transmitted in response to the Random Access Preambles; and means for determining the plurality of timing advance parameters based, at least in part, on Timing Advance Commands in the received Random Access Response messages.

\* \* \* \* \*